US008239355B2

(12) United States Patent
Sekine et al.

(10) Patent No.: US 8,239,355 B2
(45) Date of Patent: Aug. 7, 2012

(54) MAP DATA UPDATE METHOD AND MAP DATA UPDATE SYSTEM

(75) Inventors: Minoru Sekine, Shinagawa (JP); Masaaki Ohira, Iwaki (JP); Hirofumi Otsuka, Shinagawa (JP); Hitoshi Konishi, Haga (JP); Masayuki Arai, Haga (JP); Toshihide Yofu, Haga (JP); Yuji Yokota, Haga (JP)

(73) Assignees: Alpine Electronics, Inc., Tokyo (JP); Honda Motor Co., Ltd., Tokyo (JP); Mobilemedia Brain Association, Inc., Tokyo (JP)

( * ) Notice: Subject to any disclaimer, the term of this patent is extended or adjusted under 35 U.S.C. 154(b) by 381 days.

(21) Appl. No.: 11/639,442

(22) Filed: Dec. 14, 2006

(65) Prior Publication Data
US 2007/0143014 A1      Jun. 21, 2007

(30) Foreign Application Priority Data

Dec. 15, 2005   (JP) .................................. 2005-361555

(51) Int. Cl.
*G06F 7/00*          (2006.01)
(52) U.S. Cl. ........................................................ 707/695
(58) Field of Classification Search ............... 707/104.1, 707/10, 100, 7, 695, 687
See application file for complete search history.

(56) References Cited

U.S. PATENT DOCUMENTS

| | | | |
|---|---|---|---|
| 6,424,933 B1 * | 7/2002 | Agrawala et al. .................. 703/2 |
| 6,453,233 B1 | 9/2002 | Kato | |
| 6,477,526 B2 * | 11/2002 | Hayashi et al. ................ 701/532 |
| 6,820,001 B2 * | 11/2004 | Norimoto ...................... 701/428 |
| 6,980,907 B2 | 12/2005 | Umezu et al. | |
| 6,985,901 B1 * | 1/2006 | Sachse et al. .......................... 1/1 |
| 7,554,930 B2 * | 6/2009 | Gaddis et al. ................. 370/254 |
| 7,606,663 B2 * | 10/2009 | Neef et al. ..................... 701/425 |
| 7,783,687 B2 * | 8/2010 | Nomura ........................ 701/430 |
| 2002/0120622 A1 * | 8/2002 | Hasegawa et al. ................. 707/3 |
| 2003/0026268 A1 * | 2/2003 | Navas ............................ 370/400 |

(Continued)

FOREIGN PATENT DOCUMENTS

JP         2001-75967         3/2001

(Continued)

OTHER PUBLICATIONS

Notification of Reasons for Refusal dated Oct. 19, 2010, from the corresponding Japanese Application.

*Primary Examiner* — Khanh Pham
*Assistant Examiner* — Eliyah S Harper
(74) *Attorney, Agent, or Firm* — Katten Muchin Rosenman LLP

(57) ABSTRACT

A map data update method for updating nationwide updated version map data using route-specific update data is disclosed. This method has a step of creating route-specific update data, comprising update data for all routes which have been newly opened since the time of release of the nationwide updated version map data; a step of storing a plurality of route-specific update data sets with different creation dates; a step of, when updating the nationwide updated version map data of the time of release stored in a navigation apparatus in use of a prescribed first route-specific update data which has been stored, storing pre-update map files necessary to restore the nationwide updated version map data; and a step of using the first route-specific update data to update the nationwide updated version map data.

7 Claims, 16 Drawing Sheets

U.S. PATENT DOCUMENTS

| | | | |
|---|---|---|---|
| 2004/0068525 A1* | 4/2004 | Yamazaki | 707/201 |
| 2004/0193370 A1 | 9/2004 | Umezu et al. | |
| 2004/0220957 A1* | 11/2004 | McDonough | 707/102 |
| 2005/0021510 A1* | 1/2005 | Uchida et al. | 707/3 |
| 2005/0162523 A1* | 7/2005 | Darrell et al. | 348/211.2 |
| 2005/0203937 A1* | 9/2005 | Nomura | 707/102 |
| 2006/0044407 A1* | 3/2006 | Barbeau | 348/211.3 |
| 2006/0095202 A1* | 5/2006 | Atarashi et al. | 701/208 |
| 2006/0167934 A1* | 7/2006 | Nomura | 707/104.1 |
| 2007/0160365 A1* | 7/2007 | Aoyagi | 396/429 |

FOREIGN PATENT DOCUMENTS

| | | |
|---|---|---|
| JP | 2004-12319 | 1/2004 |
| JP | 2004-295207 | 10/2004 |
| JP | 2005-202883 | 7/2005 |

* cited by examiner

DIFFERENCE DATA FILE (UPDATE FILE)

| |
|---|
| NEW MAP FILE: NEW MAP DATA A |
| OLD MAP FILE: LEADING ADDRESS AND SIZE OF COINCIDENCE AREA 1 ($AD_1$, $S_1$) |
| NEW MAP FILE: NEW MAP DATA B |
| OLD MAP FILE: LEADING ADDRESS AND SIZE OF COINCIDENCE AREA 3 ($AD_3$, $S_3$) |
| NEW MAP FILE: NEW MAP DATA C |
| OLD MAP FILE: LEADING ADDRESS AND SIZE OF COINCIDENCE AREA 2 ($AD_2$, $S_2$) |
| NEW MAP FILE: NEW MAP DATA D |

FIG. 12
(A)
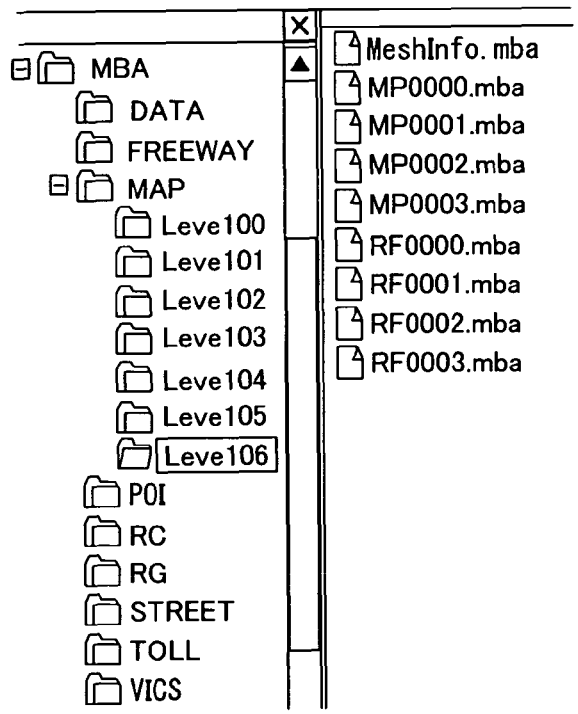
(B)
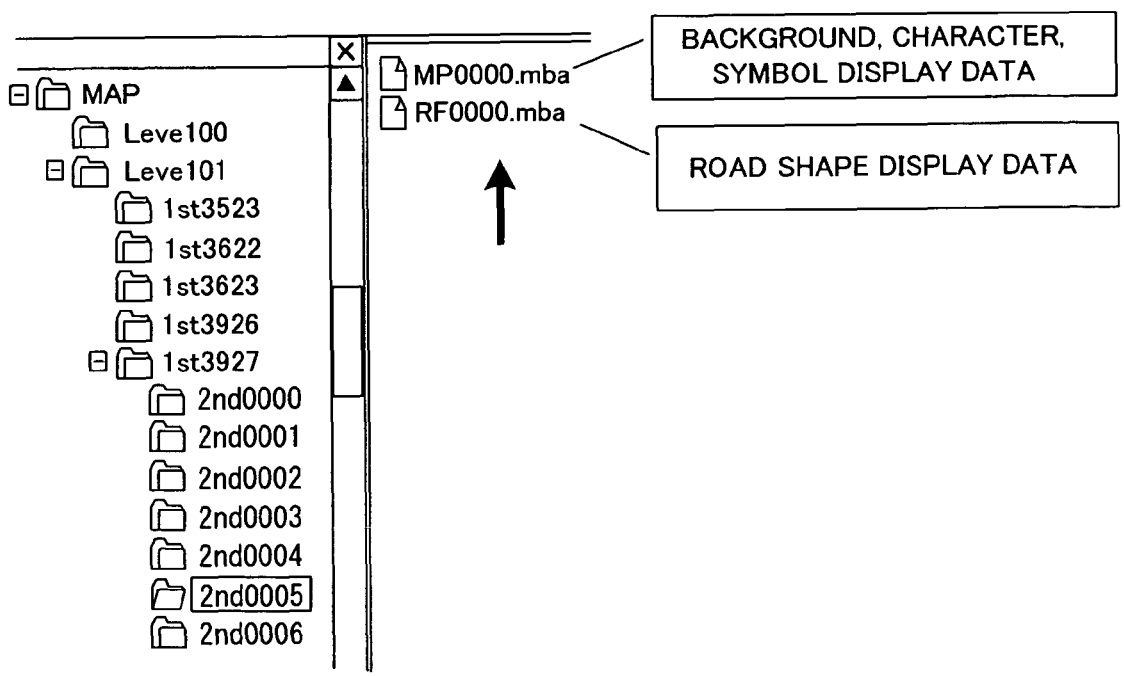

FIG. 13

(A) CONFIGURATION OF INFORMATION SEARCH DATA

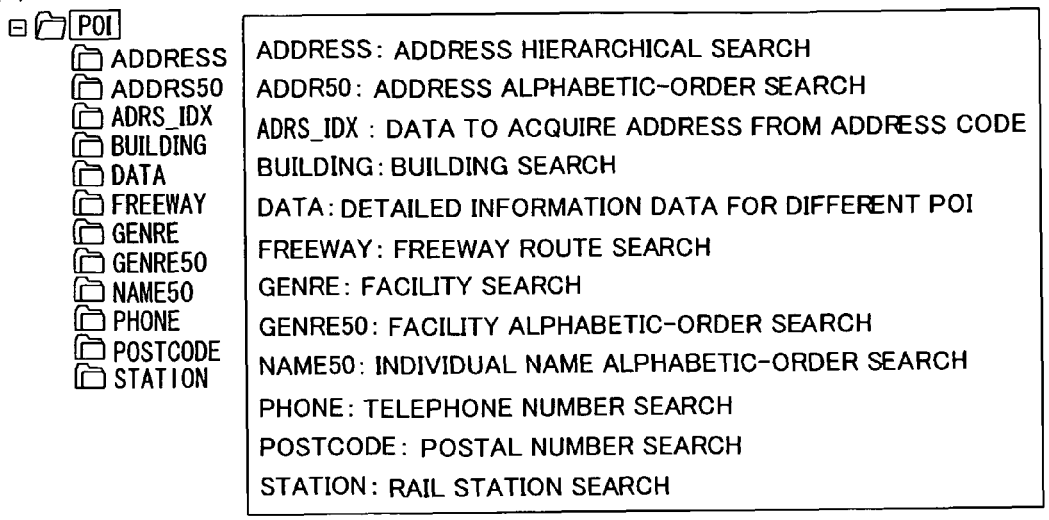

ADDRESS: ADDRESS HIERARCHICAL SEARCH
ADDR50: ADDRESS ALPHABETIC-ORDER SEARCH
ADRS_IDX : DATA TO ACQUIRE ADDRESS FROM ADDRESS CODE
BUILDING: BUILDING SEARCH
DATA: DETAILED INFORMATION DATA FOR DIFFERENT POI
FREEWAY: FREEWAY ROUTE SEARCH
GENRE: FACILITY SEARCH
GENRE50: FACILITY ALPHABETIC-ORDER SEARCH
NAME50: INDIVIDUAL NAME ALPHABETIC-ORDER SEARCH
PHONE: TELEPHONE NUMBER SEARCH
POSTCODE: POSTAL NUMBER SEARCH
STATION: RAIL STATION SEARCH (B) FREEWAY ROUTE SEARCH

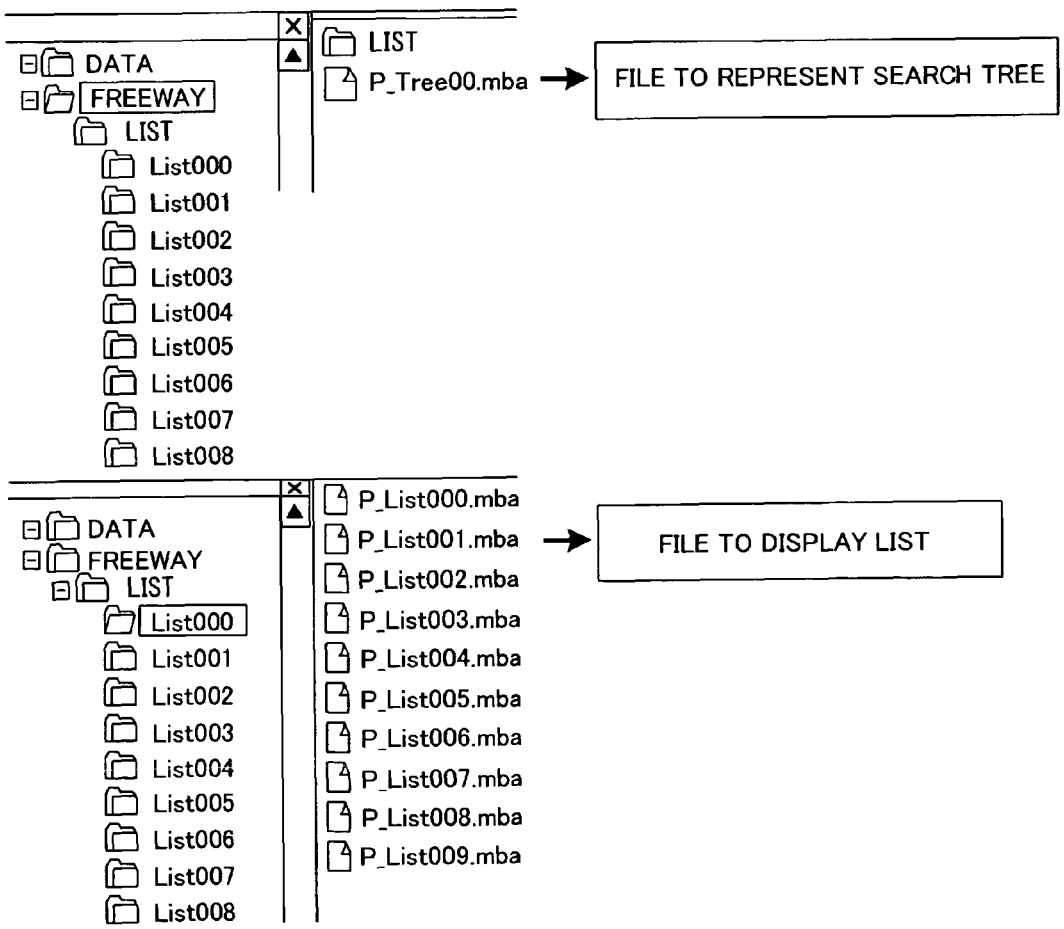

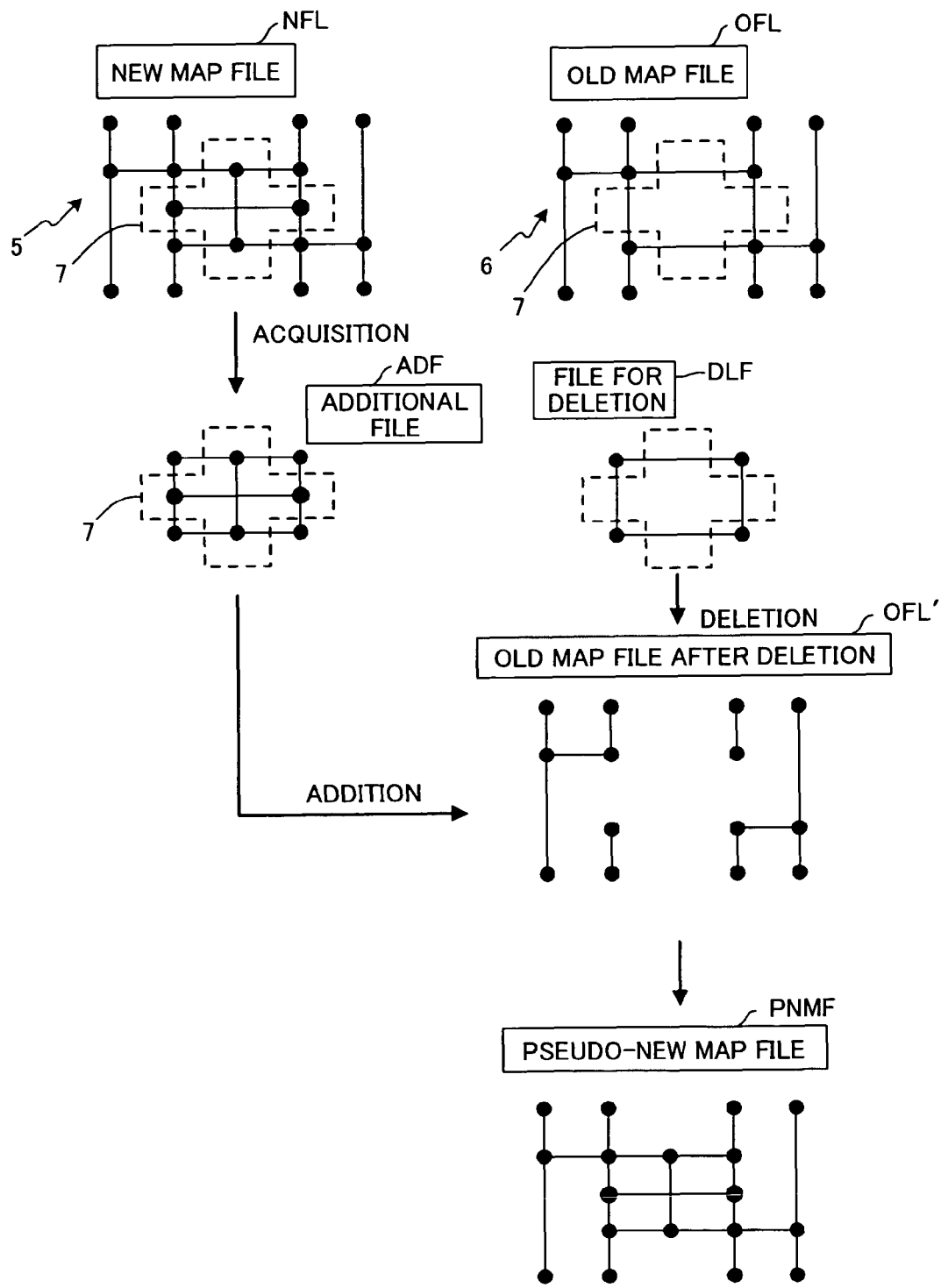

MAP DATA UPDATE METHOD AND MAP DATA UPDATE SYSTEM

BACKGROUND OF THE INVENTION

This invention relates to a map data update method and to a map data update system, and in particular relates to a map data update method and map data update system for performing updates of nationwide updated versions of map data using route-specific update data.

A navigation apparatus reads map data from a CD-ROM, DVD, HDD, or other storage media according to the current position of a vehicle, generates map images, and draws maps on a display screen, as well as displaying a vehicle symbol at a fixed position on the display screen, and scrolling the displayed map according to the vehicle travel. Map data comprises (1) road layer information, comprising node data, road link data, intersection data, and similar; (2) background layer information, to display objects on the map; and, (3) character layer information, to display the names of cities, towns and villages, and other characters. Map images displayed on the display screen are generated based on background layer information and character layer information; route search processing from a departure point to a destination, processing to display the route on a map and provide guidance, map-matching processing, and similar are performed based on road layer information. In addition to the above, a navigation apparatus comprises POI (Point of Interest) display functions for displaying prescribed POI symbols on maps, map enlargement/reduction functions, map three-dimensional display functions, and various other functions.

However, map data stored on recording media becomes out-of-date with the passage of time, due to new road construction and other modifications to topographic data, openings and closings of facilities, preparation of sites for housing, and for other reasons. Hence a method has been proposed in which map data is recorded onto a hard disk HDD or other map storage portion, and when there are modifications to map data, the map data on the hard disk HDD is overwritten with the latest map data. In this technology of the prior art, the user obtains the difference between the new map data and the old map data from a center by means of communication, or purchases an update DVD on which is recorded the difference between the new map data and the old map data, and updates the hold map data on the hard disk HDD with the new map data. By this means, the new map data recorded on the hard disk HDD can be used in navigation control, and moreover a DVD player device for use in enjoying music or videos can also be used as a DVD player device for maps; in addition, music and videos can be enjoyed during navigation control.

FIG. 7 is a summary explanatory drawing of update DVD creation processing by an update data creation device.

Map data comprises numerous files, and so in the update data creation device (not shown), processing is performed to extract the differences, for each file, between the new map file NFL for the new version (Ver. 2) and the old map file OFL for the old version (Ver. 1), to create difference data files (update files) $RNF_1$ to $RNF_N$; thereafter, all the update files $RNF_1$ to $RNF_N$ are combined to create the update data, and this update data is written to a DVD to create an update DVD.

FIG. 8 is a diagram explaining a method of creation, for each file, of difference data file (update file); the new map file NFL and old map file OFL are compared in byte units, a search is performed for data areas 1 to 3 in the old map file OFL which coincides with data areas 1' to 3' in the new map file NFL, and the leading addresses AD1 to AD3 and sizes S1 to S3 of the data areas 1 to 3 are determined as coincidence area identification data. Then, new map data A to D not coinciding with the old map data, and the coincidence area identification data, are arranged in order to create the difference data file shown in FIG. 9. In FIG. 8, locations at which arrows indicate both are areas at which the data in the old file is the same as that in the new map file; unmatched data DLTM in the old map file OFL is discarded, and the unmatched data A to D in the new map file NFL is used as difference data.

In the example of FIG. 8, the difference data file is as shown in FIG. 9. That is, the difference data file comprises the following data.

*New map file: New map data A
*Old map file: Data identifying coincidence area 1 (leading address $AD_1$, size $S_1$)
*New map file: New map data B
*Old map file: Data identifying coincidence area 3 (leading address $AD_3$, size $S_3$)
*New map file: New map data C
*Old map file: Data identifying coincidence area 2 (leading address $AD_2$, size $S_2$)
*New map file: New map data D FIG. 10 explains update processing by a navigation apparatus which uses an update DVD, on which is recorded update data, to update old map data on a hard disk HDD to new map data. When performing a map update, the hard disk reading portion 2 of the navigation apparatus reads the old map files OFL of Version 1 from the hard disk 3 and inputs the files to the update processing portion 4, and the DVD playback portion 5 reads the difference data files from the update DVD 1 and inputs the files to the update processing portion 4. The update processing portion 4 uses the difference data files and the old map files OFL of Version 1 to generate, for each file, new map files NFL for Version 2, and the hard disk writing portion 6 overwrites the old map files OFL with the new map files NFL.

If the difference data file sizes become too large, then time is required by the processing to create new map files from the old map files and the difference data files, and there is the problem that music CDs, video DVDs and similar cannot be enjoyed for a long length of time. Hence this applicant has proposed a method for reducing the sizes of difference data files. In the proposed method, a new map is drawn using new map data and a replacement range is specified in the new map which has been drawn, the map data portion of the replacement range is created as an additional file ADF, the map data portion of the replacement range is deleted from the old map data, pseudo-new map data is created for use by incorporating the additional file ADF into the old map data after the deletion to create update data, and the old map data and the pseudo-new map data are used to create difference data. By this means, only the locations necessary for navigation control, such as for example the map data portions for a newly opened route, can be provided as an additional file, and the size of the update data for the route can be made small.

FIG. 11 explains the principle of update file creation; the pseudo-new map data is created, and using the pseudo-new map data and the old map data, update data is created and used for updating the old map data held in the navigation apparatus to new map data.

The additional file creation portion 11 extracts from the new map data NMP the required locations (newly opened routes) and creates an additional file ADF in accordance with the proposed method. The additional file incorporation portion 12 creates pseudo-new map data PNMP for use by deleting the data portion for additional file incorporation from the old map data OMP, and incorporating the additional file ADF into the old map data after the deletion to create update data.

The pseudo-new map data PNMP does not completely coincide with the new map data NMP, but includes the necessary modifications (route modification portions). The update data creation portion 13 uses the old map data OMP and the pseudo-new map data PNMP to create an update DVD on which the update data RNW is recorded, by the method explained using FIG. 8 and FIG. 9.

FIG. 12 and FIG. 13 are figures explaining map data. As shown in (A) of FIG. 12, for each of various functions (DATA, FREEWAY, MAP, POI, RC, RG, STREET, TOLL, VICS), the map data is divided finely by level or area and created with a directory structure, and is recorded on recording media. Among the various functions, DATA is landmark data, junction map data and similar; FREEWAY is freeway data; MAP is map data; POI is POI (Point of Interest) information search data; RC is guidance route search data; and RG is route guidance data and similar.

The map data MAP is in a directory structure, and has seven levels extending from detailed maps (Level 00) to broad-area maps (Level 06); when the maps on each level are divided by a mesh, the map data MAP comprises the data file MP XXXX.mba for map display (data file for road shape display)for each mesh element and the data files RF XXX.mba for background, character, and symbol display. In (A) of FIG. 12, a Level 06 map (a map of all of Japan) is divided into four mesh elements, and the data files for map display for the mesh elements are MP 0000.mba to MP 0003.mba and RF 0000.mba to RF 0003.mba.

(B) in FIG. 12 that Level 01 is divided into five 1st mesh elements, and that one 1st mesh element is further divided into seven secondary mesh elements, with the data files for display of a prescribed secondary mesh element (2nd 0005) being MP 0000.mba and RF 0000.mba. From the above, the necessary map display data files MP 0000.mba and RF 0000.mba can be acquired by traversing in order the directory structure, from the Level 01 directory to the 1st3927 directory, and then to the 2nd0005 directory.

(A) in FIG. 13 is an example of the configuration of information search data POI, arranged by search item in a directory structure such that address hierarchical searches, address alphabetic-order searches, building searches, freeway route searches, facility searches, telephone number searches, and similar are possible. (B) in FIG. 13 is an example of the structure of FREEWAy route search data FREEWAY; in the freeway route search directory FREEWAY are two child directories LIST and P_Tree00 mba. P_Tree00 mba is a file which represents the search tree. In the directory LIST are directories List 000 to List 008 corresponding to nine regions (Hokkaido, Tohoku, Kanto, Kyushu, and similar); in the Hokkaido list directory List 000 are ten files P_list000.mba to P_list009.mba describing freeway routes.

FIG. 14 explains a method of creating and incorporating an additional file ADF which identifies road addition locations to be added to the old map data. The additional file creation portion 1 (FIG. 11) uses a prescribed new map file NFL, comprising addition locations, to draw a new map 5, and in addition uses the corresponding old map file OFL to draw the old map 6. Then, the additional file creation portion 1 specifies a replacement range 7, encompassing modified roads in the new map 5 thus drawn, and creates a map data portion within the replacement range as an additional file ADF. The additional file incorporation portion 2 deletes the map data portion (deletion portion) DLF within the replacement range 7 from the old map file OFL, and incorporates the additional file ADF into the old map file OFL' after deletion to create a pseudo-new map file PNMF.

As explained above, by means of the proposed method, update data is prepared for each newly opened route in an update data creation device, update data requested by the user (the navigation apparatus) is provided, and the old map data recorded on the HDD is updated with the update data in the navigation apparatus.

FIG. 15 explains the interface between the update data creation device and the navigation apparatus, when differentially updating map data for each newly opened route. Upon a request for update data from the navigation apparatus, the update data creation device 10 displays, on the display portion of the navigation apparatus, a "latest map confirmation screen", shown in (A) of FIG. 15, to identify the route of the update data. When the user selects a prescribed route item on this screen, the update data creation device displays the screen shown in (B) of FIG. 15; if "YES" is selected, update data for the route is downloaded.

When route A to route C are newly opened, the update data creation device prepares update data for route A, route B, route C, routes (A+B), routes (A+C), routes (B+C), and routes (A+B+C), as shown in FIG. 16, in order to provide update data for an arbitrary combination of routes.

The first reason for the necessity of update data for routes (A+B), routes (A+C), routes (B+C), and routes (A+B+C), is that the update data for route A, route B, and route C cannot be combined. That is, if the map shown in (B) is specified by first update data when route A is added to the old map shown in (A) of FIG. 17, and if the map shown in (C) is specified by second update data when route B is added to the old map shown in (A), then the map shown in (D) is specified by combination of the first update data and the second update data. On the other hand, the map indicated by (E) is specified by third update data when routes (A+B) are added to the old map shown in (A), the map of (E) being different from the map of (D). From the above, the first update data for route A and the second update data for route B cannot be used as the third update data for routes (A+B).

The second reason for the necessity of update data for routes (A+B), routes (A+C), routes (B+C), and routes (A+B+C), is that, as shown in FIG. 18, map data MPA updated by the update data RNA for route A cannot be updated by the update data RNB for route B. This is because the update data RNB for route B is created based on map data OMP for which route-specific updates have not been performed, so that if an attempt is made to update route B in map data MPA for which an update of route A has been performed, a mismatch occurs, and strange data results.

From the above, the update data creation device must prepare update data for individual routes, as well as update data which combines pluralities of routes. Hence as the number of newly opened routes increases, the number of types of update data which must be prepared becomes enormous, and the number of processes required for update data creation, and management of such processes, become unrealistic. For example, if there exist four routes A to D, the update data which must be prepared is:
 *Update data for route A
 *Update data for route B
 *Update data for route C
 *Update data for route D
 *Update data for routes A+B
 *Update data for routes A+C
 *Update data for routes A+D
 *Update data for routes B+C
 *Update data for routes B+D
 *Update data for routes C+D
 *Update data for routes A+B+C

*Update data for routes B+C+D
*Update data for routes A+C+D
*Update data for routes A+B+D
*Update data for routes A+B+C+D As shown in FIG. 19, each becomes necessary for the model of each year. As a result, this large quantity of types of update data must be stored on the update data creation device, which functions as a server, so that a large storage device becomes necessary, and there is the further problem that management is troublesome. Hence there is a need to reduce the types of update data to be stored by route.

In one method of the prior art, when map information for navigation is updated, this map data is downloaded to or installed in the navigation apparatus from an information provision center (JP2004-12319A). This method of the prior art provides a navigation apparatus with update data by means of communication, but does not store route-specific update data, and moreover does not decrease the types of route-specific update data to be stored.

SUMMARY OF THE INVENTION

Hence an object of the invention is to reduce the number of route-specific update data sets to be stored.

A further object of the invention is, after map data updating using update data, to enable further updating of map data using other update data.

The above objects can be realized by means of a map data update method which updates nationwide updated version map data using route-specific update data. A map data update method of this invention has a step of creating route-specific update data, comprising update data for all routes which have been newly opened since the time of release of the nationwide updated version map data; a step of storing a plurality of route-specific update data sets with different creation dates; a step of, when updating the nationwide updated version map data of the time of release, stored in the navigation apparatus, in use of a prescribed first route-specific update data which has been stored, storing pre-update map files necessary to restore the nationwide updated version map data; and a step of updating the nationwide updated version map data using the first route-specific update data.

A map data update method of this invention further comprises, when performing an update using a second route-specific update data after performing an update using the first route-specific update data, a step of using the stored pre-update map files to restore the nationwide updated version map data of a time of release from the map data updated by the first route-specific update data, a step of, using the second route-specific update data to update the restored nationwide updated version map data, and a step of storing pre-update map files necessary to restore the nationwide updated version map data of the time of release from the map data updated by the first route-specific update data.

Further, the above objects can be realized by means of a map data update system which updates nationwide updated version map data using route-specific update data. A map data update system of this invention comprises an update data creation device, which creates route-specific update data comprising update data for all routes newly opened from the time of release of the nationwide updated version map data until creation of the route-specific update data and which stores a plurality of route-specific update data sets with different creation dates, and a navigation apparatus, which, when using a first route-specific update data stored in the update data creation device to update the nationwide updated version map data of the time of release, and thereafter, updates the nationwide updated version map data using the first route-specific update data and stores pre-update map files necessary to restore the nationwide updated version map data from the map data updated by the first route-specific data.

An update data creation device of this invention comprises a route-specific update data creation portion, which creates route-specific update data comprising update data for all routes newly opened from the time of release of nationwide updated version map data until the time of creation of the route-specific update data; an update data storage portion, which stores a plurality of the route-specific update data sets created with different creation dates; and a route-specific update data provision portion, which, upon a request from a navigation apparatus, provides to the navigation apparatus the requested route-specific update data.

A navigation apparatus of this invention comprises a map data storage portion, which stores map data; a route-specific update data acquisition portion, which acquires first route-specific update data from an external route-specific update data creation device; and, a map update portion which, when using the first route-specific update data to update nationwide updated version map data for a time of release stored in the map data storage portion, updates the nationwide updated version map data using the first route-specific update data stores pre-update map files necessary to restore the nationwide updated version map data from the map data updated by the first route-specific data, and stores the updated map data in the map data storage portion.

By means of this invention, route-specific update data sets with different creation dates are created, each route-specific update data set comprising update data for all routes which have newly opened between the time of release of nationwide updated version map data and the time of creation of the route-specific update data. And since it is sufficient for the update data creation device to store the route-specific update data sets with different creation dates, the types of route-specific update data stored can be reduced.

Further, by means of this invention, the nationwide updated version map data of the time of release can be restored, and the nationwide updated version map data can be updated using prescribed route-specific update data, so that after updating map data using a first route-specific update data, it is possible to perform an update using another, second route-specific update data.

Further, by means of this invention, when using first route-specific update data to update nationwide updated version map data of the time of release, stored in a navigation apparatus, pre-update map files necessary to restore the nationwide updated version map data are stored, so that the nationwide updated version map data of the time of release can easily be restored.

Further, by means of this invention, route-specific update data is created each time a new route is newly opened, so that map updates can be performed using route-specific update data according to user demand.

Further, by means of this invention, the creation date of each route-specific update data, the names of newly opened routes, and the newly opened road sections are displayed, so that a prescribed route-specific update data can easily be selected by referring to the display.

Other features and advantages of the present invention will be apparent from the following description taken in conjunction with the accompanying drawings.

BRIEF DESCRIPTION OF THE DRAWINGS

FIG. 12 is a first explanatory diagram of map data;

FIG. 13 is a second explanatory diagram of map data;

FIG. 14 is an explanatory diagram of the creation and method of incorporation of an additional file ADF, identifying road addition locations for addition to old map data;

DESCRIPTION OF THE PREFERRED EMBODIMENTS

Figure 1:
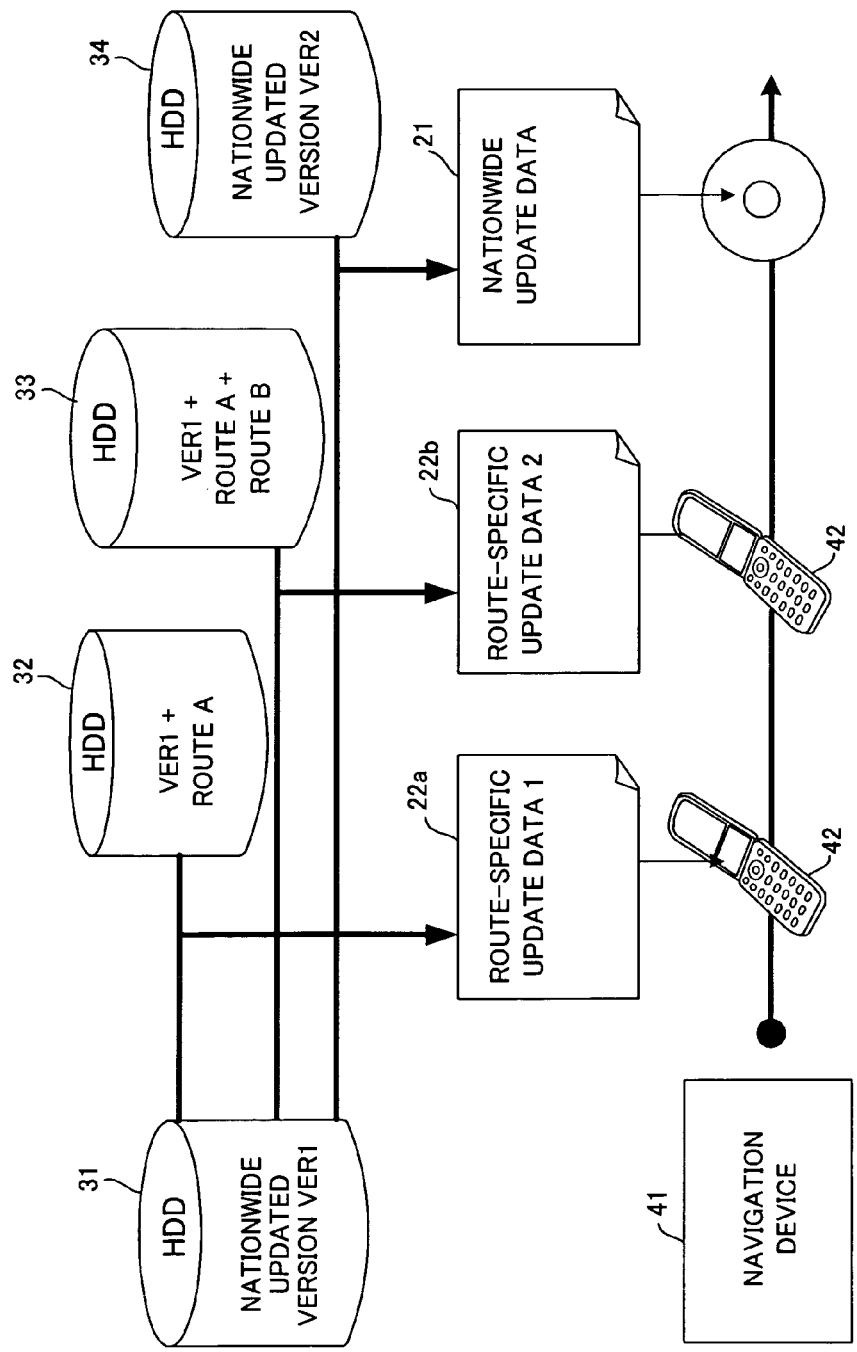
FIG. 1 is a summary explanatory diagram of the invention.

FIG. 1 is a summary explanatory diagram of the invention. In this invention, update data is classified into update data for a nationwide updated version (nationwide update data) 21, which is common to all users, and update data for route-specific updated versions (route-specific update data) 22a, 22b, . . . , for updates performed individually by user. Update data is always created based on map data 31 for the nationwide updated version(VER1), and moreover, when performing route-specific updates, is created route-specific update data comprising all routes newly opened from the time of release of the nationwide updated version (VER1) until the time of the route-specific update. For example, when new openings of the routes A and B occur, in the order route A→route B, after the release of the nationwide updated version map data (VER1) 31, route-specific update data is prepared as follows:

*When route A is newly opened: Route-specific update data 22a for route A to update the nationwide updated version (VER1) 31 *When route B is newly opened: Route-specific update data 22b for routes (A+B) to update the nationwide updated version (VER1) 31

. . . .

*At time of release of a new nationwide updated version (VER2): Nationwide update data 21 for a nationwide updated version (VER2) to update the nationwide updated version (VER1) 31

This data is created and prepared in a center server (update data creation device), not shown. In this case, the update date, newly opened route name, and newly opened road sections are appended to the update data.

In this state, if the vehicle navigation apparatus 41 acquires the update data 22a for route A from the center server via a wireless terminal 42 and updates the map data stored on the hard disk HDD, the map data is updated to a new map (VER1+route A) 32 with the map data of route A added. Similarly, if the navigation apparatus 41 acquires the update data 22b for routes (A+B) from the server via the wireless terminal 42 and updates the map data stored on the hard disk HDD, the map data is updated to a new map (VER1+route A+route B) 33 with the map data for route A and route B added. Further, if all update data 21 is acquired, either by communication or through a purchased DVD, and the map data stored on the hard disk HDD is updated, then the map data is updated to the nationwide updated version of the map data (VER2) 34.

However, as explained above, update data is always created based on the nationwide updated version (VER1) 31. Hence prior to updating map data stored on the hard disk using update data, it is necessary to store data which is needed to restore this nationwide updated version (VER1) 31. The data needed to restore this nationwide updated version (VER1) 31 is pre-update map files.

Figure 2:
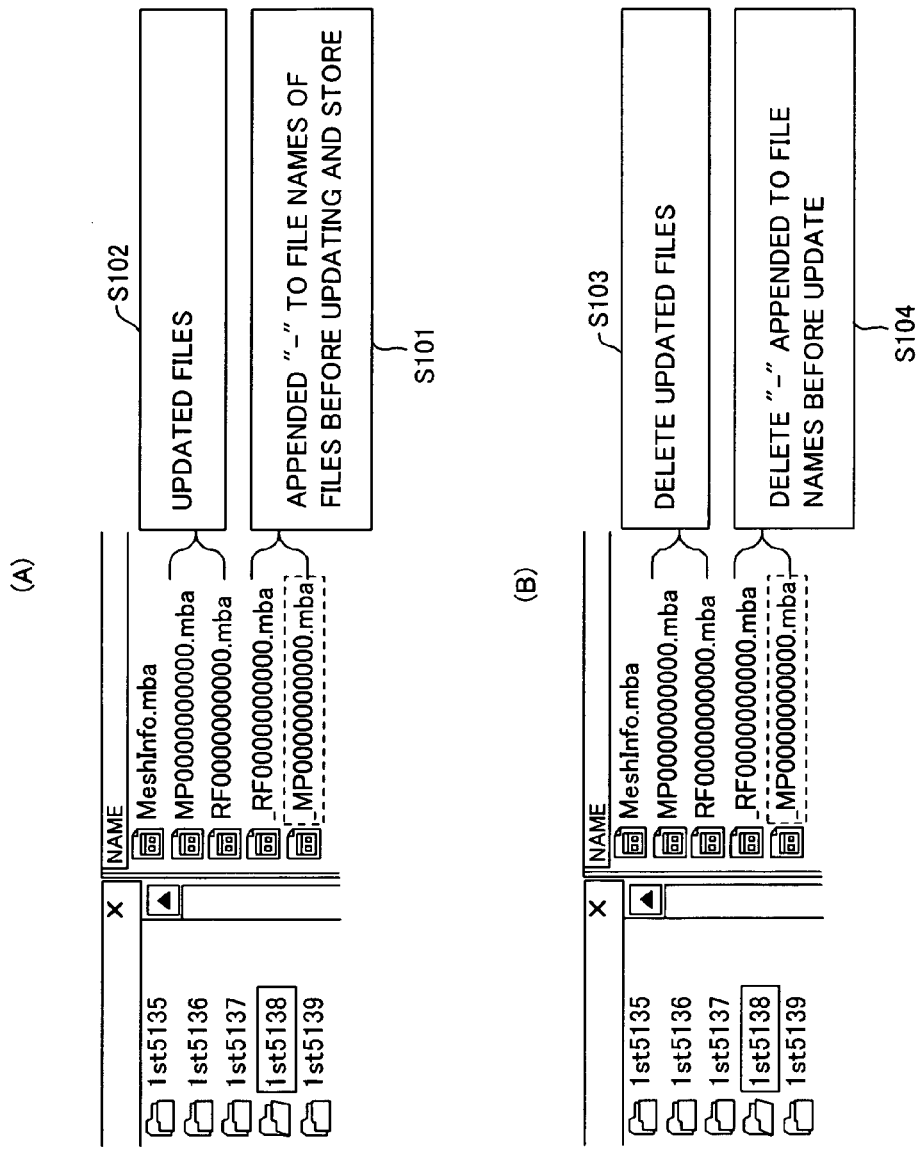
FIG. 2 is an explanatory diagram of map update processing of the invention.

FIG. 2 is an explanatory diagram of map update processing of this invention. Prior to using route-specific update data 22a (FIG. 1) to update map data (comprising numerous map files) of the nationwide updated version (VER1) 31, stored on the hard disk HDD of the navigation apparatus, pre-update map files needed to restore the nationwide updated version(VER1) are stored in the free space of the hard disk HDD (S101). For example, as shown in (A) of FIG. 2, the pre-update map files are created and stored by appending a "-" to the file name of the map files of the nationwide updated version(VER1), and thereafter, the map files are updated using the route-specific update data 22a (S102).

Then, when the updated map data is again to be updated using route-specific update data 22b, the previously updated map files are deleted (S103) from the map data updated by the route-specific update data 22a, as shown in (B) of FIG. 2. The previously updated map files have the same file names as the pre-update map files stored with "-" appended. Then, the "-" appended to the file names of the pre-update map files which have been stored is deleted, and the map data of the nationwide updated version (VER1) 31 is restored (S104). After restoration, the procedure explained in (A) of FIG. 2 is used to perform update processing. When map data which has once been updated is to be updated using nationwide update data 21, a similar procedure is used, restoring the nationwide updated version (VER1) 31 before updating to the nationwide updated version map data (VER2) 34; in this case, however, there is no need to store data necessary to restore the nationwide updated version (VER1) 31.

Figure 3:
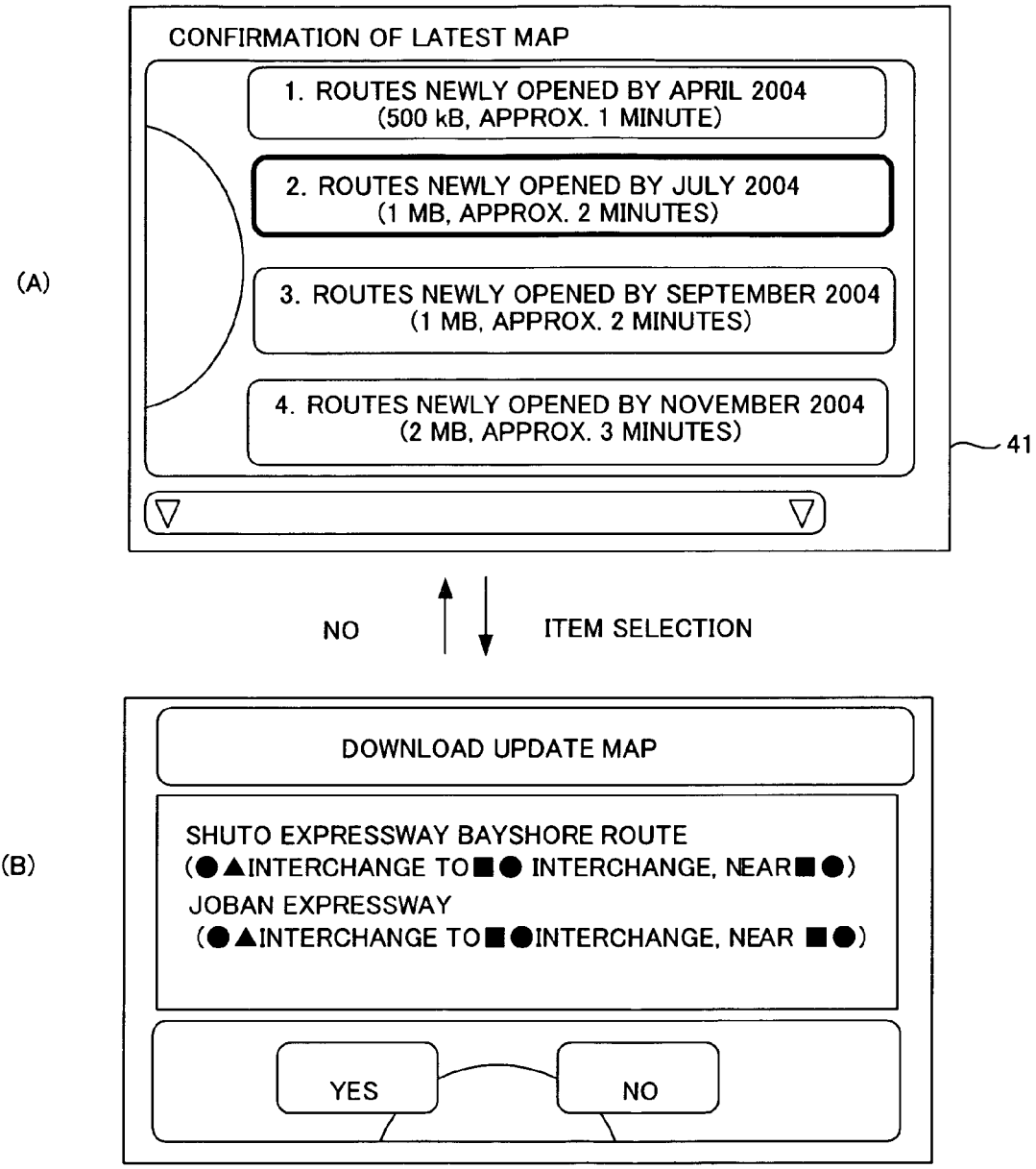
FIG. 3 is an explanatory diagram of an interface between a center server (update data creation device) and a navigation apparatus of this invention, for the case of differential updating of map data using update data for all routes newly opened from the time of release of nationwide updated version map data to a prescribed date.

FIG. 3 is an explanatory diagram of an interface between a center server (update data creation device) and a navigation apparatus of this invention, for the case of differential updating of map data using route-specific update data for all routes newly opened from the time of release of nationwide updated version map data (VER1) to a prescribed date.

When there is a request for update data from the navigation apparatus 41, the center server displays, on the display device of the navigation apparatus, a "latest map confirmation screen", shown in (A) of FIG. 3, to specify the date until which update data is required. When the user selects prescribed year, month and day items on this screen, the center server displays the screen shown in (B) of FIG. 3, and if "YES" is selected, the route-specific update data for the route is downloaded. If "NO" is selected, the "latest map confirmation screen" is again displayed.

As explained above, in this invention, it is sufficient to prepare only route-specific update data for all routes which have newly opened from the time of release of the nationwide updated version map data until a prescribed date for each date, so that the types of update data to be stored can be reduced. For example, if the routes A, B, C, and D have been newly opened in this order, then in the prior art, it would be necessary to prepare the following 15 differential data sets:

*Update data for route A
*Update data for route B
*Update data for route C
*Update data for route D
*Update data for routes A+B
*Update data for routes A+C
*Update data for routes A+D
*Update data for routes B+C
*Update data for routes B+D
*Update data for routes C+D
*Update data for routes A+B+C
*Update data for routes B+C+D
*Update data for routes A+C+D
*Update data for routes A+B+D
*Update data for routes A+B+C+D However, by means of this invention, it is sufficient to prepare and store only four differential data sets:

*Update data for route A
*Update data for routes A+B
*Update data for routes A+B+C
*Update data for routes A+B+C+D and so the types of update data to be stored can be reduced. In particular, the greater the number of newly opened routes, the greater the effect of this invention in reducing the types of update data.

Figure 4:
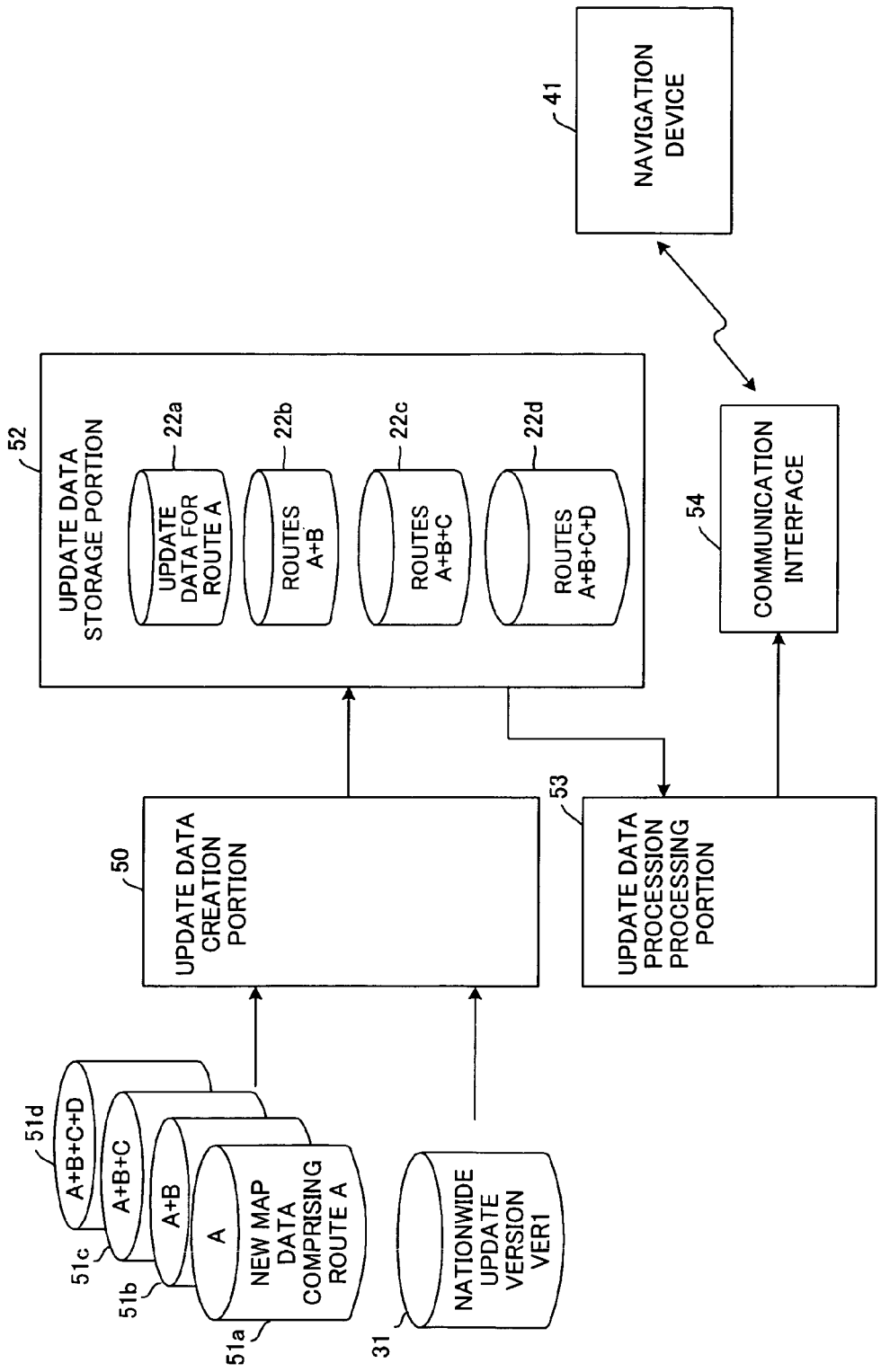
FIG. 4 is a diagram of the configuration of a center server as an update data creation device.

FIG. 4 shows the configuration of a center server as an update data creation device. The update data creation device 50 uses new map data (pseudo-new map data) 51a, comprising route A, and nationwide updated version map data (for example, nationwide updated version (VER1)) 31, to create route-specific update data 22a, which is stored in the update data storage portion 52. Similarly, the update data creation portion 50 uses new map data (pseudo-new map data) 51b, 51c, 51d, comprising the routes A+B, A+B+C, and A+B+C+D, and a nationwide updated version (VER1) 31 to create route-specific update data 22b, 22c, 22d, which are stored in the update data storage portion 52. The update data provision portion 53 communicates with the vehicle navigation apparatus 41 via the communication interface 54, and downloads requested update data, as explained using FIG. 3.

Figure 5:
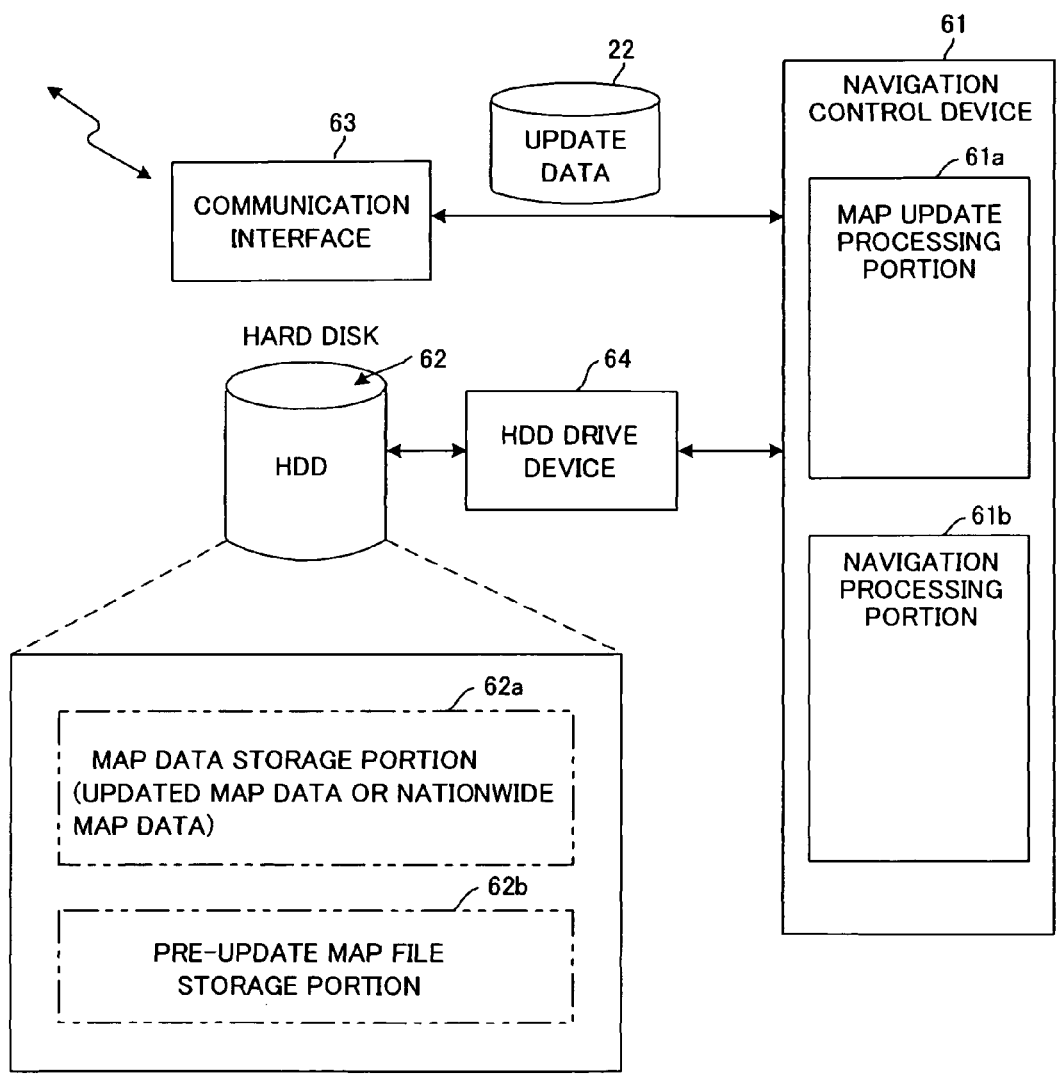
FIG. 5 is a diagram of the configuration of a navigation apparatus.

FIG. 5 shows the configuration of the navigation apparatus 41; the navigation control device 61 comprises a map update processing portion 61a which performs map update processing, and a navigation processing portion 61b which performs ordinary navigation control. The hard disk 62 comprises a map data storage portion 62a which stores nationwide updated version map data (VER1) or map data after updating, and a pre-update map file storage portion 62b which stores pre-update map files for use in restoring the nationwide updated version (VER1).

The map update processing portion 61a requests and acquires prescribed update data 22 from the center server via the communication interface 63, according to an instruction from a command instruction portion, not shown. The map update processing portion 61a controls the HDD drive device 64, reads the map data and pre-update map files from the hard disk 62, and updates map data using the pre-update map files and update data 22.

Figure 6:
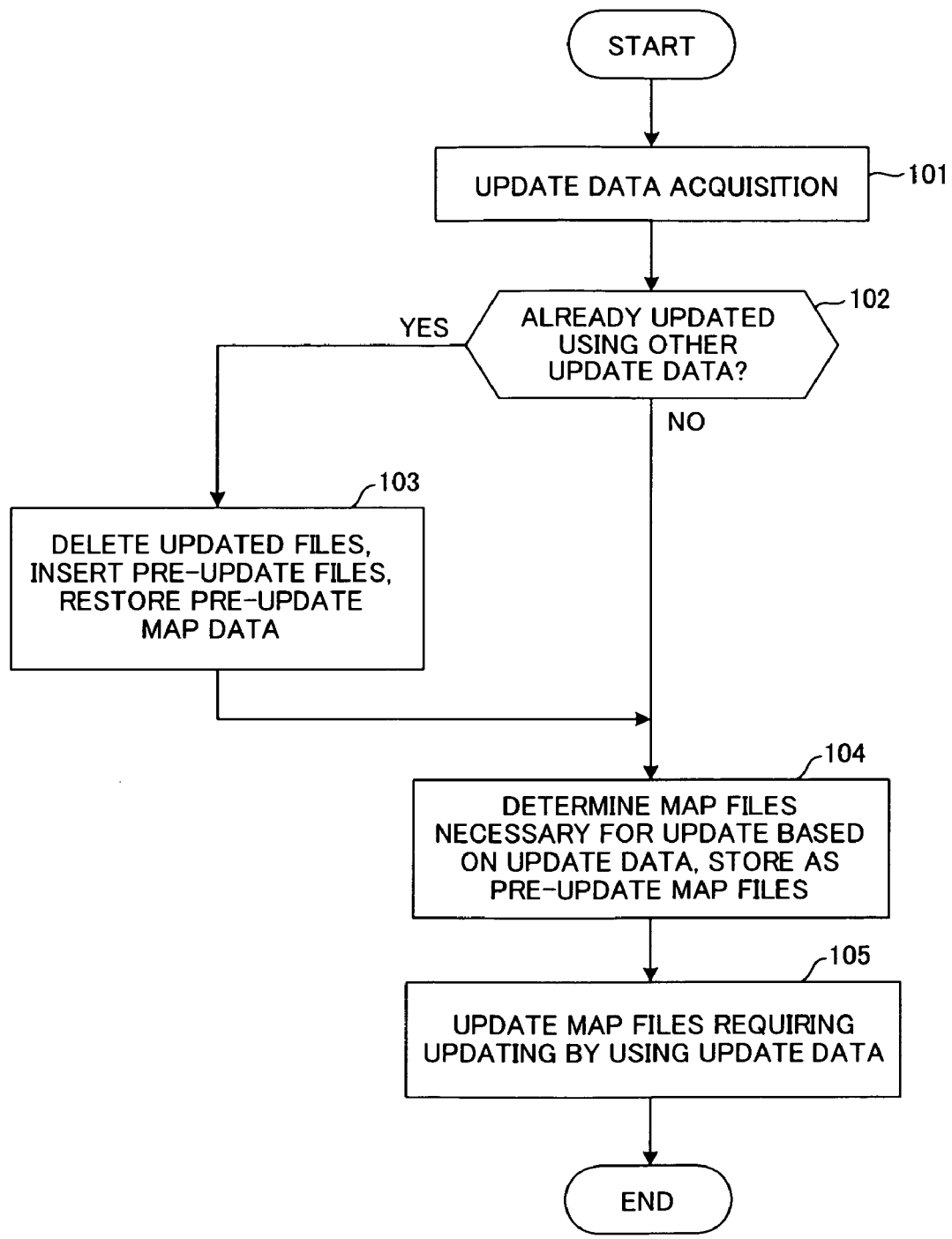
FIG. 6 shows the flow of map update processing by a map update processing portion.
Figure 7:
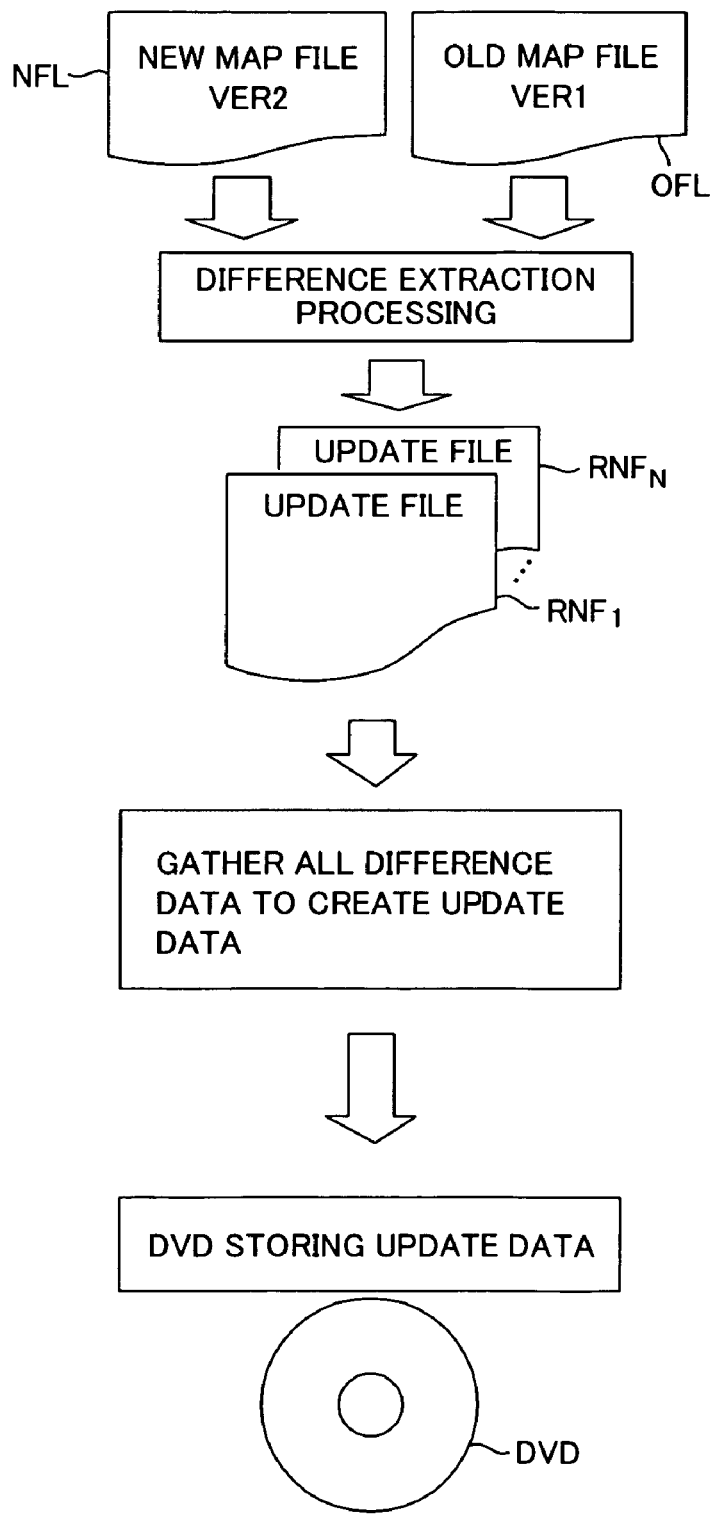
FIG. 7 is a summary explanatory diagram of update DVD creation by an update data creation device.
Figures 8, 9:
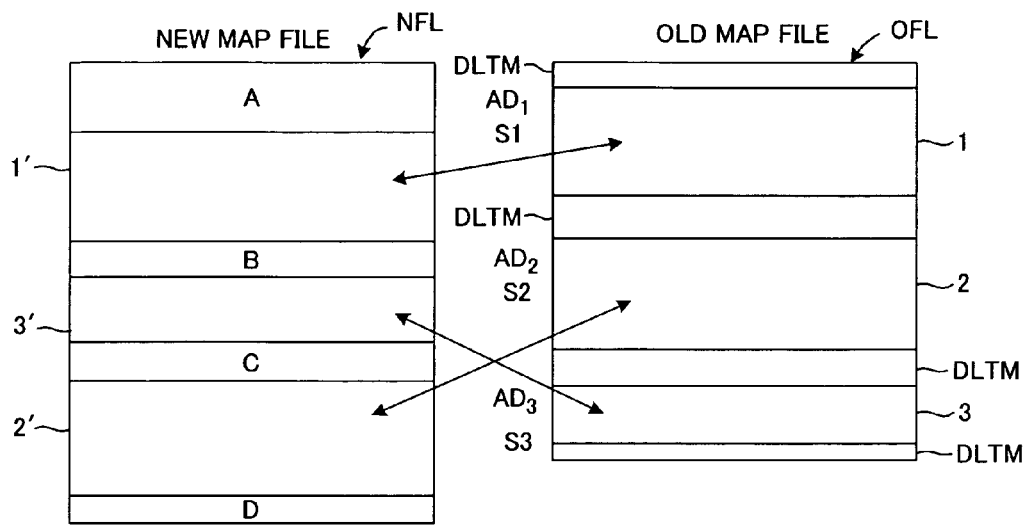
FIG. 8 is an explanatory diagram of a method of difference data file (update file) creation for each file.
FIG. 9 is an explanatory diagram of difference data files.
Figure 10:
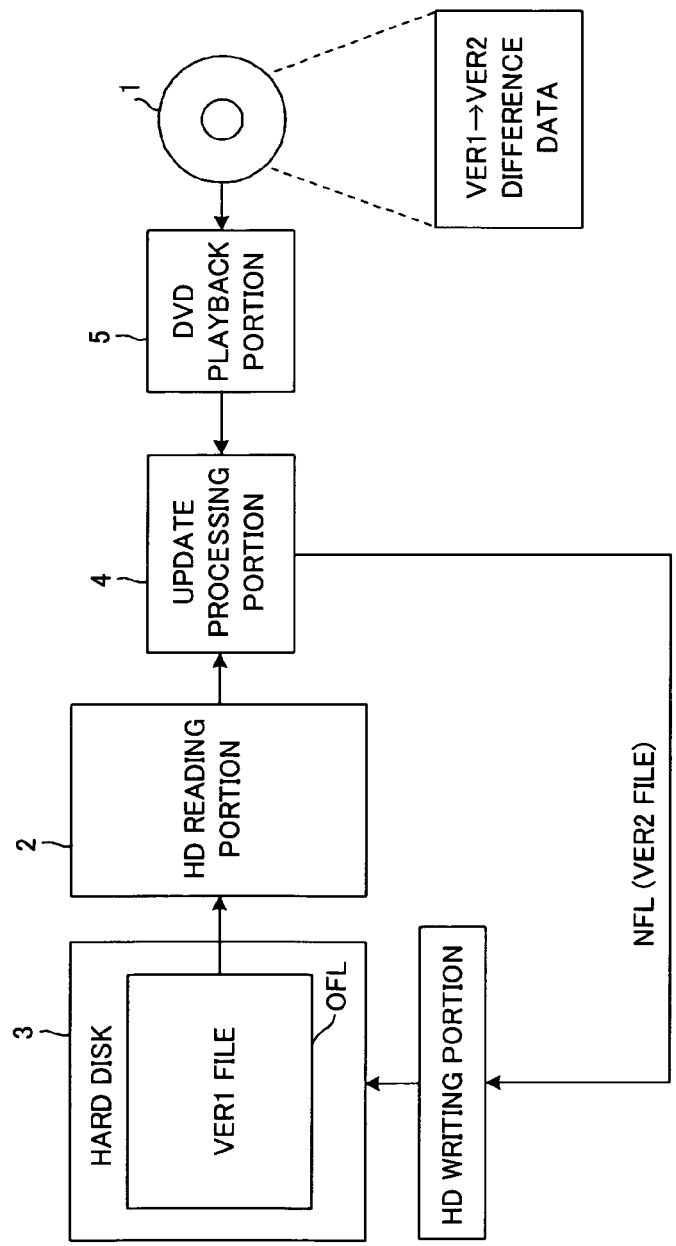
FIG. 10 is an explanatory diagram of update processing by a navigation apparatus, which updates old map data on a hard disk HDD to new map data using an update DVD on which update data is recorded.
Figure 11:
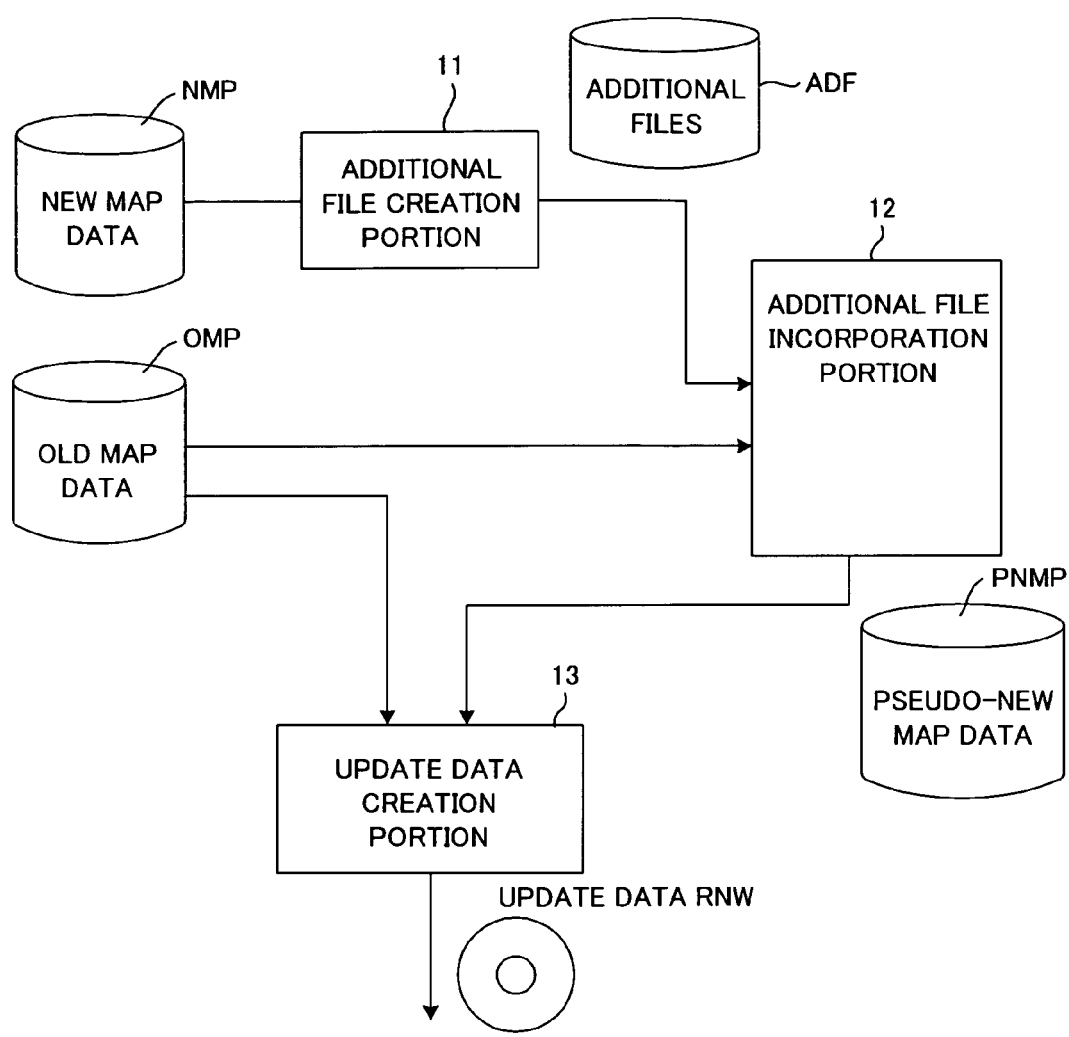
FIG. 11 is an explanatory diagram of a principle of update data creation.
Figure 15:
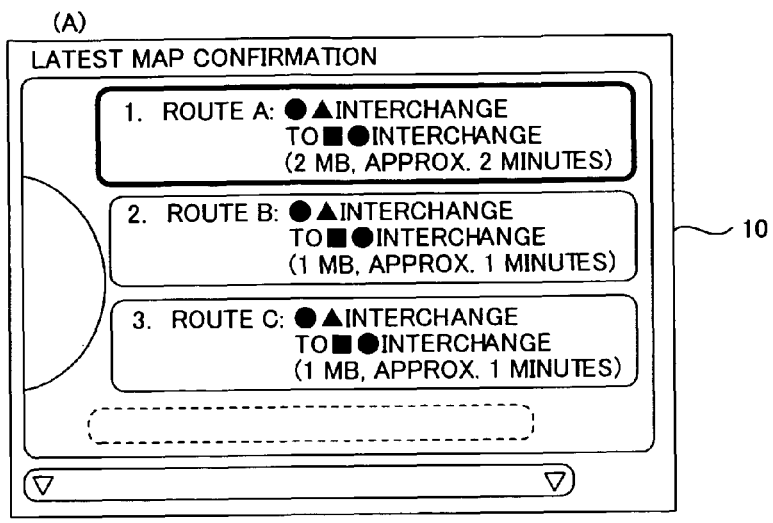
FIG. 15 is an explanatory diagram of an interface between an update data creation device and a navigation apparatus, for the case of differential updating of map data by newly-opened route.
Figure 16:
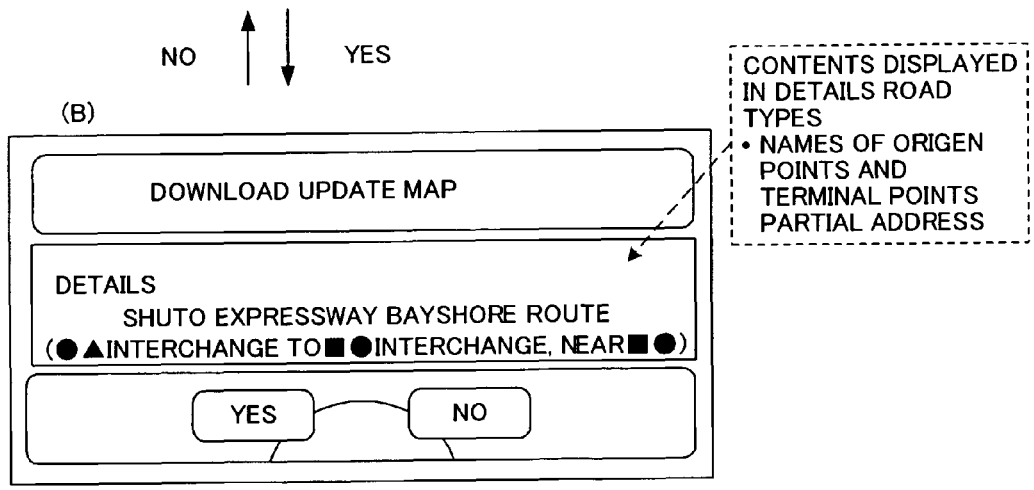
FIG. 16 is an explanatory diagram of types of update data prepared in the prior art.
Figure 17:
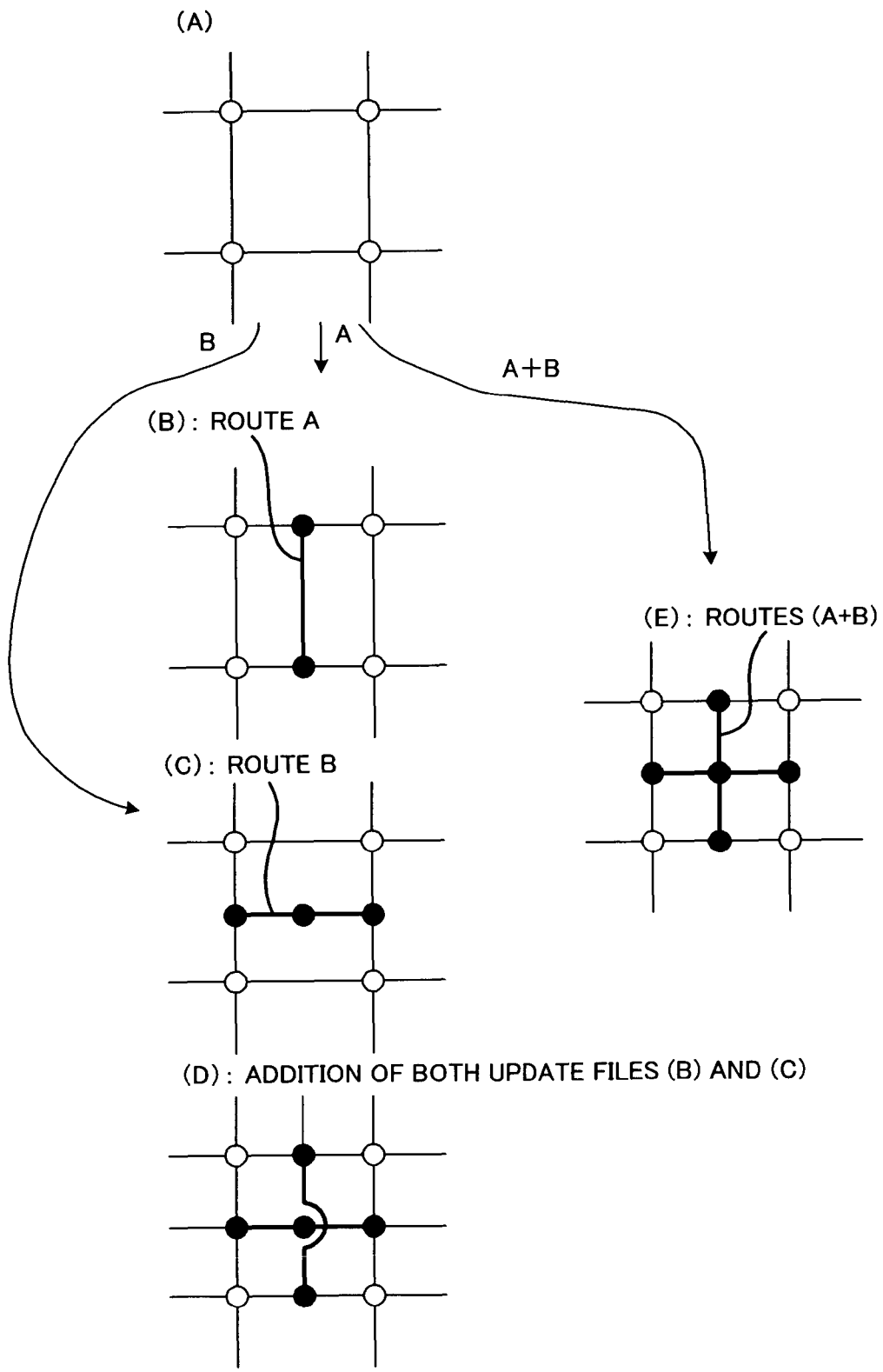
FIG. 17 explains a first reason for the need for update data for routes (A+B), routes (A+C), routes (B+C), and routes (A+B+C)
Figure 18:
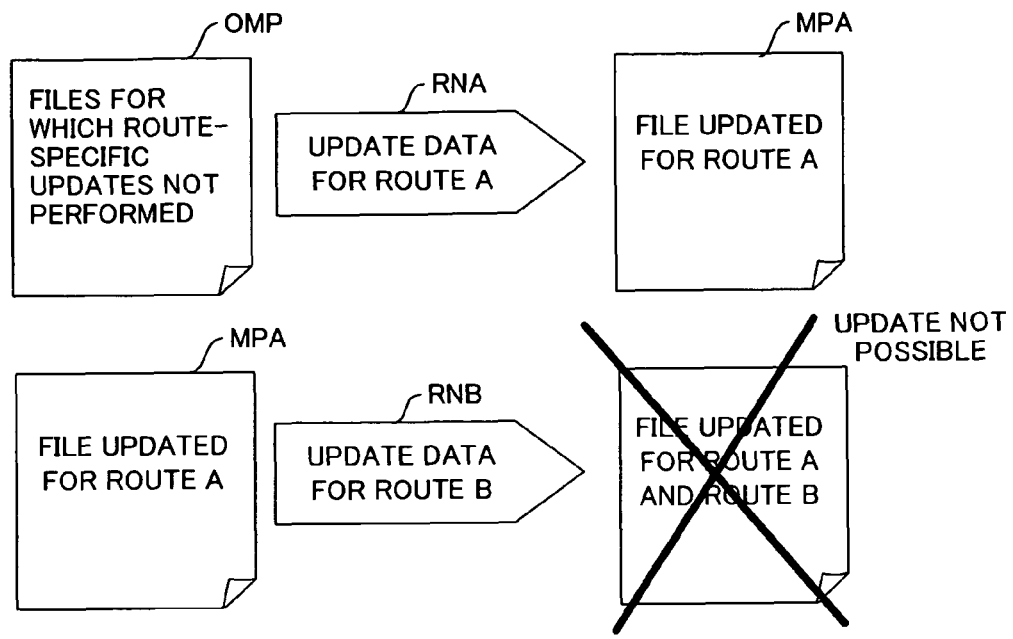
FIG. 18 explains a second reason for the need for update data for routes (A+B), routes (A+C), routes (B+C), and routes (A+B+C); and, FIG. 19 is an explanatory diagram of update data required by a plurality of models by year.
Figure 19:
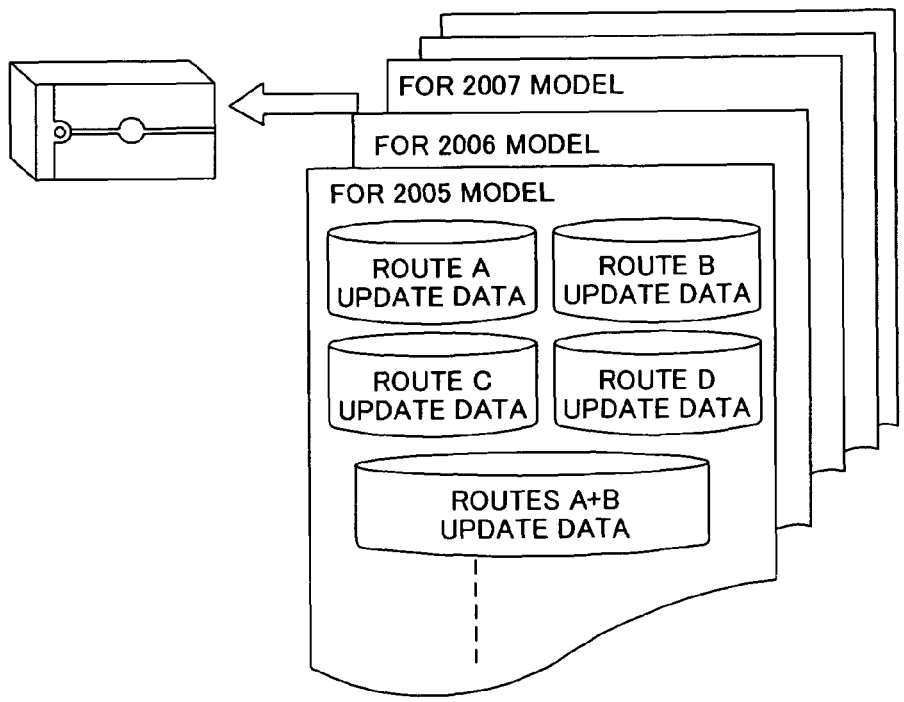

FIG. 6 shows the flow of map update processing by the map update processing portion 61a.

The map update processing portion 61a acquires update data from the center server according to instructions from the command instruction portion, and acquires the map data and pre-update map files from the hard disk 62 (step 101). Then, the map update processing portion 61a checks whether the map data acquired from the hard disk 62 has been updated one or more times (step 102), and if an update has been performed, deletes the previously updated map files, as explained using (B) of FIG. 2, deletes the "-" appended to the pre-update map files which have been stored, and restores the map data for the nationwide updated version (VER1) 31 (step 103).

When restoration processing is completed, or if the result in step 102 is "NO", then the map update processing portion 61a identifies map files necessary for update based on the update data, and as explained using (A) of FIG. 2, appends a "-" to the file names of the map files and stores the files (step 104). Then, the map update processing portion 61a updates the map data for the nationwide updated version (VER1) 31 using the update data (step 105).

By means of the above invention, the types of update data are classified to route-specific update data and nationwide update data, and only route-specific update data for all routes newly opened from the time of the release of the nationwide updated version maps to a prescribed date need be prepared for each date, so that the types of update data to be stored can be reduced.

Moreover, by means of this invention, when second update data is used to perform an update after an update by first update data, the map update by the second update data is performed after restoring the nationwide updated version map data, thereby re-update of map data can be performed, and update to the latest nationwide updated version is possible.

As many apparently widely different embodiments of the present invention can be made without departing from the spirit and scope thereof, it is to be understood that the invention is not limited to the specific embodiments thereof except as defined in the appended claims.

What is claimed is:

1. A map data update method for updating nationwide updated version map data using route-specific update data, comprising the steps of:

storing nationwide updated version map data which is comprised of a plurality of map files, in a map storage portion of a navigation apparatus:

creating every time a new route is opened in an external route-specific update data creation device, a route-specific update data comprising update data for all routes which have been opened from the time of release of the nationwide updated version map data until the opened date of said new route;

storing a plurality of the route-specific update data sets with different creation dates;

identifying a first route-specific update data set from among said plurality of the route-specific update data sets and receiving the first route-specific update data set from the external route-specific update data creation device;

storing map files of the nationwide updated version map data of the time of release which are to be updated using the first route-specific update data set, as pre-update map files;

updating the map files of the nationwide updated version map data of the time of release stored in the map storage portion, using the first route-specific update data set;

storing the map data updated using the first route-specific update data set in the map storage portion instead of the nationwide updated version map data;

when performing an update using a second route-specific update data set after performing an update using the first route-specific update data set, identifying a second route-specific update data set from among said plurality of the route-specific update data sets and receiving the second route-specific update data set from the external route-specific update data creation device;

restoring the nationwide updated version map data of the time of release from the map data updated by the first route-specific update data set using the stored pre-update map files, in which the restoration is performed by replacing map files of the map data updated by the first route-specific update data which have the same names as the stored pre-update map files, by the stored pre-update map files;

using the second route-specific update data set, to update the restored nationwide updated version map data: and storing the map data updated using the second route-specific update data set in the map storage portion instead of the map data updated by the first route-specific update data set and storing pre-update map files necessary to restore the nationwide updated version map data of the time of release from the map data updated by the second route-specific update data set.

2. The map data update method according to claim 1, wherein, in the step of storing the route-specific update data set, the creation date of the route-specific update data set, the names of the opened routes, and road section names are added to and stored in the route-specific update data set.

3. The map data update method according to claim 2, further comprising:

displaying the creation date, opened route names and opened road sections for each route-specific update data set; and selecting and identifying a prescribed route-specific update data set.

4. The map data update method according to claim 1, wherein the restoration step has a step of deleting map files having the same names as the stored pre-update map files from the map data updated by the first route-specific update data set and stored in the map storage portion, and step of returning the stored pre-update map files to restore the nationwide updated version map data of the time of release.

5. A navigation apparatus, in a map data update system which updates nationwide updated version map data using route-specific update data, comprising:

a map data storage portion, which stores map data;

a route-specific update data acquisition portion, which acquires prescribed first and second route-specific update data sets from an external route-specific update data creation device which creates every time a new route is opened, a route-specific update data set comprising update data for all routes which have been opened from the time of release of nationwide updated version map data until the opened date of said new route, and which stores a plurality of route-specific update data sets with different creation dates;

a first map update portion which stores map files of the nationwide updated version map data of the time of release which are to be updated using the first route-specific update data set, as pre-update map files, updates the map files of the nationwide updated version map data of the time of release stored in the map data storage portion using the first route-specific update data set acquired by the route-specific update data acquisition portion, and stores the map data updated using the first route-specific update data set in the map data storage portion instead of the nationwide updated version map data; and a second map update portion which, when after performing an update using the first route-specific update data set an update is performed using the second route-specific update data set acquired by the route-specific update data acquisition portion, restores the nationwide updated version map data of the time of release from the map data updated by the first route-specific update data set using the stored pre-update map files, and thereafter updates the restored nationwide updated version map data using the second route-specific update data set and stores the map data updated using the second route-specific update data set in the map data storage portion instead of the map data updated by the first route-specific update data set, and stores pre-update map files for use in restoring the nationwide updated version map data of the time of release from the map data updated by the second route-specific update data set, wherein the first route-specific update data set comprises update data for all routes opened from the time of release of the nationwide updated version map data until the time of creation of the first route-specific update data set, and the second route-specific update data set comprises update data for all routes opened from the time of release of the nationwide updated version map data until the time of creation of the second route-specific update data set, and wherein the second map update portion performs the restoration of the nationwide updated version map data of the time of release by replacing map files of the map data updated by the first route-specific update data that have the same names as the stored pre-update map files, by the stored pre-update map files.

6. The navigation apparatus according to claim 5, wherein the route-specific update data acquisition portion displays on a display portion the date of creation, names of opened routes, and names of opened road sections for each of the plurality of route-specific update data sets received from the external route-specific update data creation device, and requests and acquires, from the external route-specific update data creation device, selected prescribed route-specific update data set.

7. A map data update system, which updates nationwide updated version map data using route-specific update data, comprising:

an update data creation device, which creates every time a new route is opened, a route-specific update data set comprising update data for all routes which have been opened from the time of release of nationwide updated version map data until the opened date of said new route, and which stores a plurality of route-specific update data sets with different creation dates; and a navigation apparatus, which updates the nationwide updated version map data using the prescribed route-specific update data set stored in the update data creation device, wherein the update data creation device comprises:

a route-specific update data creation portion, which creates every time a new route is opened, a route-specific update data set comprising update data for all routes opened from the time of release of nationwide updated version map data until the opened date of said new routes;

an update data storage portion, which stores a plurality of the created route-specific update data sets with different creation dates; and a route-specific update data provision portion, which, upon requests from the navigation apparatus, provides a requested route-specific update data set to the navigation apparatus, wherein the navigation apparatus comprises:

a map data storage portion, which stores map data;

a route-specific update data acquisition portion, which acquires prescribed first and second route-specific update data sets from the update data creation portion; and a map update portion which stores map files of the nationwide updated version map data of the time of release which are to be updated using the first route-specific update data set, as pre-update map files, updates the map files of the nationwide updated version map data of the time of release stored in the map data storage portion using the first route-specific update data set acquired by the route-specific update data acquisition portion, and stores the map data updated using the first route-specific update data set in the map data storage portion instead of the nationwide updated version map data, wherein when using the second route-specific update data set acquired by the route-specific update data acquisition portion to perform an update after updating using the first route-specific update data set, the map update portion restores the nationwide updated version map data of the time of release from the map data updated by the first route-specific update data set using the stored pre-update map files, and thereafter updates the restored nationwide updated version map data using the second route-specific update data set and stores the map data updated using the second route-specific update data set in the map data storage portion instead of the map data updated by the first route-specific update data set, and stores pre-update map files for use in restoring the nationwide updated version map data of the time of release from the map data updated by the second route-specific data set, wherein the map update portion performs the restoration by replacing map files of the map data updated by the first route-specific update data that have the same names as the stored pre-update map files, by the stored pre-update map files.

* * * * *